3,244,758
REACTION OF AROMATIC HYDROCARBONS
WITH DIOLEFINS
Gert G. Eberhardt, Philadelphia, Pa., assignor to Sun Oil
Company, Philadelphia, Pa., a corporation of New
Jersey
No Drawing. Filed Mar. 20, 1963, Ser. No. 266,498
17 Claims. (Cl. 260—668)

This invention relates to the reaction of conjugated diolefins with aromatic hydrocarbons having one or more saturated substituent groups which contain benzylic hydrogen to form alkenyl aromatic hydrocarbons. More particularly the invention pertains to the reaction of such hydrocarbons under conditions whereby the product is preponderantly an alkenyl aromatic having one or more alkenyl groups and in which each alkenyl group corresponds to the combination of one molecule of the diolefin with a saturated substituent group of the starting aromatic. The invention further embraces the conversion of the alkenyl aromatic product to aromatic hydrocarbons having at least one more ring than the original aromatic hydrocarbon. In one specific aspect the invention concerns the conversion of alkyl benzenes to alkyl naphthalenes.

In the prior art toluene has been reacted with conjugated diolefins such as butadiene or isoprene using finely divided sodium as a catalyst. Reaction occurred at the methyl group rather than at the aromatic nucleus. However, under the conditions employed, the major part of the reaction product was composed of telomers resulting from the addition of a plurality of diolefin molecules to each molecule of toluene. Hence the product comprised a spectrum of telomers ranging up to a rubbery polymer. Only a minor amount of the one-to-one addition product between the toluene and diolefin was produced.

The present invention constitutes an improvement in such type of reaction whereby the product obtained is substantially all or at least preponderantly a result of adding only one molecule of the diolefin to a substituent of the starting aromatic. Thus little if any of the higher telomerization products are produced. The invention is applicable to the conversion of any aromatic hydrocarbon containing at least one saturated substituent group having benzylic hydrogen, regardless of the number of aromatic rings in the nucleus and the number of saturated substituent groups attached to the nucleus. When the starting aromatic has more than one such substituent group, the diolefin can be made to add at only one of the groups or at more than one or all of the groups in a one-to-one fashion of addition per group depending upon how far the reaction between the diolefin and aromatic is allowed to proceed.

The invention also embraces the conversion of the alkenyl aromatic obtained in the primary reaction step to another aromatic having at least one additional ring. In this conversion ring closure between the alkenyl group and the aromatic nucleus is effected. The closure occurs at the aromatic carbon atom which is ortho to the carbon atom to which the alkenyl group is attached. When the alkenyl aromatic has only one alkenyl group, this ring closure reaction yields an aromatic containing one more ring than the alkenyl aromatic. When two or more alkenyl groups per molecule are produced in the primary reaction, each group can undergo ring closure with the aromatic nucleus to produce an aromatic having at least two rings more than the alkenyl aromatic, provided that the alkenyl aromatic has a nuclear hydrogen atom ortho to each alkenyl group. The rings formed by this closure reaction can be converted to aromatic rings by dehydrogenation. Hence the invention can be utilized to convert aromatic hydrocarbons having benzylic hydrogen to higher molecular weight aromatics having one or more rings than the starting aromatic.

As used herein the term "benzylic hydrogen" is intended to mean hydrogen atoms directly attached to a carbon atom which in turn is attached to an aromatic nucleus, regardless of whether the nucleus is a single ring or a plurality of rings.

The primary reaction of the present process involves utilizing as a catalyst an alkali metal distended on a granular support, which preferably although not necessarily is an oxide of an alkali metal or alkaline earth metal such as $Na_2O$ or $CaO$. The alkali metal can be sodium, potassium, rubidium or cesium. Lithium is not operable for the present purpose. The reaction is carried out by contacting the starting aromatic at 0–250° C., more preferably 80–175° C., with a 1,3-diolefin having 4–15 carbon atoms per molecule. In order to avoid the formation of telomerization products of higher molecular weight than the desired addition product, it is important to maintain in the reaction mixture a large molar excess of the aromatic being reacted relative to the diolefin. Also vigorous conditions of agitation should be employed to insure that the diolefin will be thoroughly distributed throughout the reaction mixture. By proper application of these conditions in combination with a supported alkali metal catalyst as specified above, the diolefin can be made to add to a substituent group of the starting aromatic, or to each of several such substituents, in a one-to-one manner and little if any higher telomer products will be formed.

As a specific example of the primary reaction, toluene when reacted with butadiene under the conditions of the present process yields substantially only 5-phenylpentene-2 as depicted by the following equation:

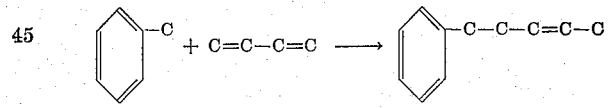

When the 5-phenylpentene-2 is reacted in the second step of the process, as hereinafter more fully described, to effect ring closure, 1-methyltetralin is formed in the following manner.

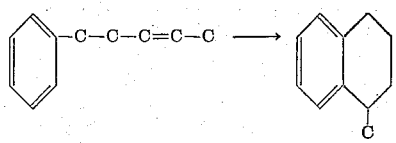

Upon dehydrogenation the 1-methyltetralin can be converted to α-methyl naphthalene. Thus the invention provides a manner of producing α-methyl naphthalene from toluene.

When a xylene is substituted for toluene in the above reaction and ring closure of the alkenyl aromatic product is effected, the resulting product is dimethyltetralin with one methyl group in the 1-position and the position of the other depending upon which xylene isomer was selected as the starting aromatic. For example, using o-xylene, the first reaction produces 5-o-tolyl-pentene-2 and the ring closure reaction yields 1,5-dimethyltetralin, as follows:

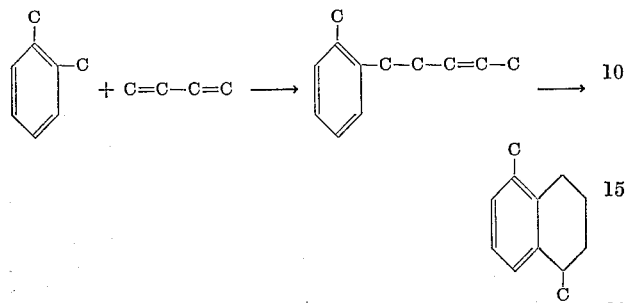

Using m-xylene, the intermediate product would be 5-m-tolyl-pentene-2 and the product of ring closure 1,6-dimethyltetralin. With p-xylene, the corresponding product would be 5-p-tolyl-pentene-2 and 1,7-dimethyltetralin, respectively.

When ethylbenzene is selected as the starting aromatic, its reaction with butadiene yields 5-phenyl-hexene-2 which will ring close to form 1,4-dimethyltetralin, as illustrated below:

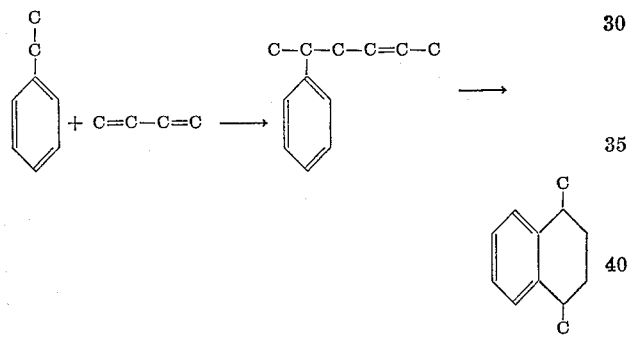

It can thus be seen that by utilizing selected alkylbenzenes specific alkyl naphthalenes can be made by carrying out the above reactions and then dehydrogenating the product from the ring closure reaction. Likewise, by starting with alkyl naphthalenes, alkyl aromatics having three or more condensed rings can be made in accordance with the invention.

When the starting aromatic has more than one alkyl group containing benzylic hydrogen, each such alkyl group can be made to react with one molecule of the diolefin to form a plurality of alkenyl groups provided that the reaction between the two starting hydrocarbons is carried far enough. Thereafter ring closure of each alkenyl group to the aromatic nucleus can be effected provided that the nucleus has a hydrogen atom in a position ortho to each of the alkenyl substituents. Thus o-xylene can be reacted with two moles of butadiene to form two C₅ alkenyl groups on the benzene ring and each alkenyl group can then be closed with the ring to form a tricyclic nucleus. Dehydrogenation of the product forms 1,8-dimethylphenanthrene. The following equations depict this conversion:

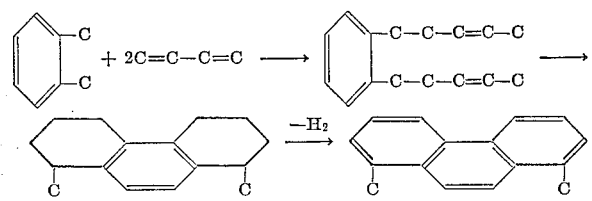

From the foregoing description it can be seen that the present invention is capable of converting a wide variety of alkyl aromatics to alkyl aromatics of higher molecular weight which contain a larger number of rings than the starting aromatic. Such conversion is applicable to any starting aromatic which has at least one saturated substituent group containing benzylic hydrogen and which is unsubstituted at a position which is ortho to such group. In the specific illustrations given above the alkyl groups in the aromatic hydrocarbon products are all methyl groups. However aromatic products can also be produced in which the alkyl groups have two or more carbon atoms. This can be done by starting with an aromatic in which the alkyl group or groups have three or more carbon atoms or by using a diolefin of higher molecular weight than butadiene or both. Thus the reaction of n-propylbenzene and piperylene can give 1,4-diethylnaphthalene as follows.

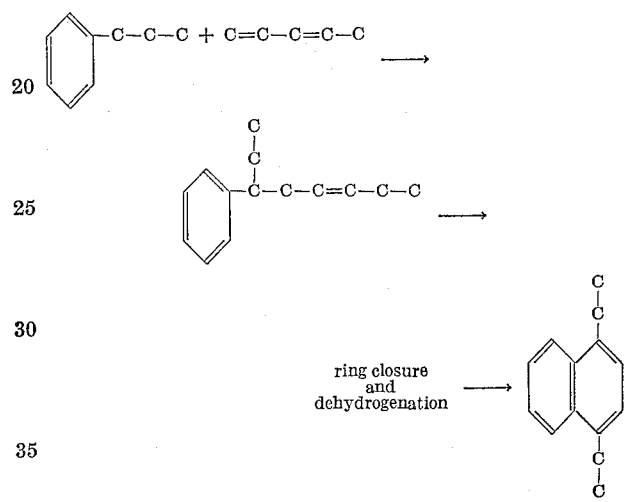

As previously stated the catalyst for effecting the primary reaction is an alkali metal, other than lithium, distended on a granular support. Preferably the alkali metal employed is sodium or potassium. It is important that the alkali metal be distended on a granular support that provides a relatively large surface area, as otherwise reaction between the diolefin and the starting aromatic would result in large yields of higher telomers instead of the desired one-to-one addition product in which only one diolefin molecule combines with a substituent group. The preferred support material is an oxide of an alkali metal or alkaline earth metal, such as $Li_2O$, $Na_2O$, $K_2O$, CaO, MgO, BaO or SrO. Support materials of this type with the alkali metal distended thereon provide the most effective catalyst for promoting the desired reaction. However, the reaction can also be carried out by using any finely divided or granular inert material, such as sodium chloride, potassium carbonate, ground limestone, alumina, fuller's earth, diatomaceous earth, charcoal, activated carbon, sand, silica gel, siliceous cracking catalysts or the like.

In preparing the supporting alkali metal catalyst the granular support material should be thoroughly dried as by calcining prior to use. The alkali metal is then added to the dry support material, and the mixture is heated to above the melting point of the alkali metal and stirred until the particles of support material have become thoroughly and uniformly coated. Only a small proportion of alkali metal in the mixture is needed, for example, 0.1–5.0% by weight. For effecting the primary reaction the thus prepared catalyst can be used in the form of a dispersion in the hydrocarbon reactants or as a bed with the reactants being passed therethrough in liquid or vapor form. When the reaction is carried out batchwise with the catalyst dispersed in the hydrocarbon liquid, the catalyst can readily be recovered from the reaction product by filtration, settling or centrifuging and thereafter reused in the process.

As previously indicated, it is highly important in carrying out the primary reaction to maintain a large excess of the aromatic reactant relative to the diolefin throughout the reaction mixture in order to prevent formation of substantial amounts of higher telomers. Thus, when the reaction is conducted batchwise, a dispersion of the catalyst in the aromatic is first made and the diolefin is then fed slowly thereto while the mixture is vigorously agitated. The diolefin can be passed into the reaction zone either in gaseous or liquid phase, but in either event the degree of agitation should be sufficient to insure immediate distribution of the diolefin throughout the reaction mixture and effect intimate contact with the catalyst. If the reaction is carried out continuously utilizing a bed of the catalyst, a mixture of reactants containing a large excess of the aromatic can be fed thereto either in liquid or vapor form and turbulent flow should be maintained within the bed to provide continuous intimate mixing. In this type of operation a column containing an elongated catalyst bed can be used and the diolefin advantageously can be added in increments along the length of the column in order to insure a low concentration of the diolefin at all points throughout the reaction zone.

The hydrocarbon reaction mixture from the primary reaction step can be separated from the catalyst and subjected to distillation to recover unreacted aromatic from the reaction product. The recovered aromatic can be recycled for further reaction. The alkenyl aromatic product can then be used in the next step of the process.

Ring closure of the alkenyl aromatic product, as depicted in the equations shown above, can be effected readily and practically quantitatively by means of an acidic alkylation catalyst. This reaction will take place at temperatures from below 0° C. to relatively high temperatures, e.g., 300° C. Preferably the reaction is carried out at room temperature. At relatively high temperatures undesirable isomerization and dealkylation reactions may tend to occur depending upon the catalyst used. A preferred catalyst is hydrogen fluoride, since it will promote the ring closure reaction essentially quantitatively and without undesirable side reactions. Sulfuric acid is also suitable, although under certain conditions it may tend to cause some degree of sulfonation. Acidic cracking catalysts, such as silica-alumina or silica-magnesia, also are suitable and preferably are used at about room temperature.

The product from the preceding step can be dehydrogenated under well known dehydrogenation conditions to produce the corresponding polycyclic aromatic hydrocarbon. This can be done by passing it over a platinum catalyst at temperatures in the range of 300–450° C. Particularly suitable conditions for effecting such dehydrogenation involve passing the material together with hydrogen over a non-acidic platinum on alumina catalyst at a temperature of 370–425° C., a pressure of 150–300 p.s.i.g., a liquid hourly space velocity of 1–3 and a hydrogen recycle rate of 3–6 moles per mole of the hydrocarbon.

In an alternative manner of operation it is possible to effect the ring closure and dehydrogenation reactions in a single step. This can be done, for example, by contacting the alkenyl aromatic product from the primary reaction step at a temperature in the range of 250–400° C. with a catalyst having both cyclicizing and dehydrogenating properties, for example, platinum on either alumina or silica-alumina. The alkenyl aromatic can thus be converted in a single operation to the final polycyclic aromatic hydrocarbon. For example, by passing 5-phenylpentene-2 (derived from toluene and butadiene) over a platinum on alumina catalyst at 325° C., α-methyl naphthalene can be made in a single reaction stage.

The following examples are specific illustrations of the invention:

Example I

This example shows the preparation of 1,5-dimethyl-naphthalene from o-xylene. The catalyst was prepared by vigorously stirring at about 120° C. a mixture of 60 g. of finely divided $Na_2O$ and 2.5 g. of potassium in a flask blanketed with nitrogen. After about 15 minutes the powder had assumed a light gray color and no liquid potassium was left. 500 ml. of o-xylene were then added to the flask, and the slurry was vigorously agitated and heated to 105° C. under a nitrogen blanket. After about 30 minutes the color of the catalyst was reddish brown. Butadiene was then added slowly to the gas space in the reactor and vigorous agitation of the slurry was continued. As the reaction proceeded, the color of the slurry turned dark brown. A total of 24 g. of butadiene was added during a reaction time of 5 hours. The reaction mixture was then cooled, the catalyst was destroyed by the addition of isopropanol and the supernatant liquid was decanted from the solids. Excess o-xylene was removed by distillation and the residual product was then distilled under vacuum. All of the product boiled in the range of 78–85° C. at 1 mm. Hg absolute. The infrared spectrum of the product showed that it had one internal olefinic bond and analysis by vapor phase chromatography gave only a single peak. From these results the product was concluded to be substantially all 5-m-tolyl-pentene-2. This material was treated with anhydrous HF in a pressure bomb for about 30 minutes at room temperature, after which the HF was vented and the product was washed with water. The product was then dehydrogenated by passing it over a platinum on alumina reforming catalyst at about 350° C. The dehydrogenated product, which was obtained in almost quantitative yield, had a melting point of 81° C. which corresponds to the melting point of 1,5-dimethyl-naphthalene.

Example II

Substantially the same procedure was followed as in the preceding example except that toluene was substituted for o-xylene. The alkenyl aromatic product obtained boiled at about 90° C. at 1 mm. Hg pressure. It exhibited only a single peak in vapor phase chromatography and its infrared spectrum showed that it was an aromatic internal olefin. Ring closure followed by dehydrogenation converted it substantially quantitatively to α-methylnaphthalene.

Analogous results are obtained by substituting for o-xylene or toluene other aromatics having benzylic hydrogen, by substituting other 1,3-diolefins having up to 15 carbon atoms for butadiene or by substituting sodium, rubidium or cesium for potassium. The reactions will proceed in an analogous manner when the substituent group that provides benzylic hydrogen in the starting aromatic occurs in a non-aromatic ring as, for example, in acenaphthene.

I claim:

1. Method of making an alkenyl aromatic hydrocarbon which comprises reacting at a temperature in the range of 0–250° C. an aromatic hydrocarbon containing at least one saturated substituent group having benzylic hydrogen with an aliphatic conjugated diolefin having 4–15 carbon atoms and a double bond in the alpha position in the presence of a catalyst which is an alkali metal distended on a granular support, said alkali metal being selected from the group consisting of sodium, potassium, rubidium and cesium, said reacting being effected by slowly adding to said aromatic hydrocarbon throughout the reaction period the conjugated diolefin and contacting the two reactants by vigorously agitating the mixture so as to maintain in the reaction mixture throughout the reaction a large molar excess of said aromatic relative to said diolefin, whereby the product formed is preponderantly an alkenyl aromatic in which each alkenyl group corresponds to the combination of one molecule of the diolefin with a saturated substituent group of said aromatic, and separating as the preponderant product from the reaction mixture an alkenyl aromatic which is the one-to-one addition product of the aromatic and the diolefin.

2. Method according to claim 1 wherein said temperature is in the range of 80–175° C.

3. Method according to claim 2 wherein said granular support is a metal oxide in which the metal is selected from the group consisting of alkali metals and alkaline earth metals.

4. Method according to claim 1 wherein said granular support is a metal oxide in which the metal is selected from the group consisting of alkali metals and alkaline earth metals.

5. Method according to claim 1 wherein said diolefin is butadiene.

6. Method of converting an aromatic hydrocarbon to a higher molecular weight aromatic hydrocarbon having at least one more ring than the starting hydrocarbon which comprises reacting at a temperature in the range of 0–250° C. an aromatic hydrocarbon containing at least one saturated substituent group having benzylic hydrogen and having at least one hydrogen atom on the aromatic nucleus ortho to said substituent group with an aliphatic conjugated diolefin having 4–15 carbon atoms and a double bond in the alpha position in the presence of a catalyst which is an alkali metal distended on a granular support, said alkali metal being selected from the group consisting of sodium, potassium, rubidium and cesium, said reacting being effected by slowly adding to said aromatic hydrocarbon throughout the reaction period the conjugated diolefin and contacting the two reactants by vigorously agitating the mixture so as to maintain in the reaction mixture throughout the reaction a large molar excess of said aromatic relative to said diolefin, whereby the product formed is preponderantly an alkenyl aromatic in which each alkenyl group corresponds to the combination of one molecule of the diolefin with a saturated substituent group of said aromatic, and contacting the alkenyl aromatic product with an acidic alkylation catalyst under alkylating conditions, whereby ring closure of the alkenyl group to the aromatic nucleus occurs at the position of said hydrogen atom.

7. Method according to claim 6 wherein said temperature is in the range of 80–175° C.

8. Method according to claim 7 wherein said granular support is a metal oxide in which the metal is selected from the group consisting of alkali metals and alkaline earth metals.

9. Method according to claim 6 wherein said granular support is a metal oxide in which the metal is selected from the group consisting of alkali metals and alkaline earth metals.

10. Method according to claim 6 wherein said diolefin is butadiene.

11. Method according to claim 6 additionally comprising dehydrogenating the ring closure product whereby the ring formed by said closure becomes an aromatic ring condensed with the starting aromatic nucleus.

12. Method according to claim 11 wherein said temperature is in the range of 80–175° C. and said granular support is a metal oxide in which the metal is selected from the group consisting of alkali metals and alkaline earth metals.

13. Method according to claim 12 wherein the starting aromatic is an alkyl benzene and the dehydrogenation product is an alkyl naphthalene.

14. Method which comprises reacting o-xylene and butadiene at a temperature in the range of 0–250° C. in the presence of a catalyst which is an alkali metal distended on a granular support, said alkali metal being selected from the group consisting of sodium, potassium, rubidium and cesium, said reacting being effected by slowly adding to the o-xylene throughout the reaction period the butadiene and contacting the two reactants by vigorously agitating the mixture so as to maintain in the reaction mixture a large molar excess of o-xylene relative to butadiene, whereby 5-o-tolyl-pentene-2 is formed as the main reaction product, contacting the 5-o-tolyl-pentene-2 with an acidic alkylation catalyst under alkylation conditions, whereby ring closure of the olefinic group with the aromatic nucleus occurs, and dehydrogenating the ring closure product to form 1,5-dimethylnaphthalene.

15. Method which comprises reacting m-xylene and butadiene at a temperature in the range of 0–250° C. in the presence of a catalyst which is an alkali metal distended on a granular support, said alkali metal being selected from the group consisting of sodium, potassium, rubidium and cesium, said reacting being effected by slowly adding to the m-xylene throughout the reaction period the butadiene and contacting the two reactants by vigorously agitating the mixture so as to maintain in the reaction mixture a large molar excess of m-xylene relative to butadiene, whereby 5-m-tolyl-pentene-2 is formed as the main reaction product, contacting the 5-m-tolyl-pentene-2 with an acidic alkylation catalyst under alkylation conditions, whereby ring closure of the olefinic group with the aromatic nucleus occurs, and dehydrogenating the ring closure product to form 1,6-dimethylnaphthalene.

16. Method which comprises reacting p-xylene and butadiene at a temperature in the range of 0–250° C. in the presence of a catalyst which is an alkali metal distended on a granular support, said alkali metal being selected from the group consisting of sodium, potassium, rubidium and cesium, said reacting being effected by slowly adding to the p-xylene throughout the reaction period the butadiene and contacting the two reactants by vigorously agitating the mixture so as to maintain in the reaction mixture a large molar excess of p-xylene relative to butadiene, whereby 5-p-tolyl-pentene-2 is formed as the main reaction product, contacting the 5-p-tolyl-pentene-2 with an acidic alkylation catalyst under alkylation conditions, whereby ring closure of the olefinic group with the aromatic nucleus occurs, and dehydrogenating the ring closure product to form 1,7-dimethylnaphthalene.

17. Method which comprises reacting ethylbenzene and butadiene at a temperature in the range of 0–250° C. in the presence of a catalyst which is an alkali metal distended on a granular support, said alkali metal being selected from the group consisting of sodium, potassium, rubidum and cesium, said reacting being effected by slowly adding to the ethylbenzene throughout the reaction period the butadiene and contacting the two reactants by vigorously agitating the mixture so as to maintain in the reaction mixture a large molar excess of ethylbenzene relative to butadiene, whereby 5-phenylhexene-2 is formed as the main reaction product, contacting the 5-phenylhexene-2 with an acidic alkylation catalyst under alkylation conditions, whereby ring closure of the olefinic group with the aromatic nucleus occurs, and dehydrogenating the ring closure product to form 1,4-dimethylnaphthalene.

References Cited by the Examiner

UNITED STATES PATENTS

| | | | |
|---|---|---|---|
| 1,934,123 | 11/1933 | Hofmann et al. | 260—668 |
| 2,603,655 | 7/1952 | Strain | 260—668 |
| 2,729,688 | 1/1956 | Anderson et al. | 260—668 |
| 2,781,324 | 2/1957 | Haensel | 260—668 |
| 2,823,240 | 2/1958 | Field et al. | 260—668 |
| 2,901,518 | 8/1959 | Raley | 260—668 |
| 2,958,643 | 11/1960 | Friedman | 260—668 |

OTHER REFERENCES

Egloff et al.: Isomerization of Pure Hydrocarbons, Reinhold Publishing Corporation, New York (1942), pages 162–164, 366 and 367.

DELBERT E. GANTZ, *Primary Examiner.*

ALPHONSO D. SULLIVAN, *Examiner.*

C. R. DAVIS, *Assistant Examiner.*